United States Patent [19]

Kitaori et al.

[11] Patent Number: 5,060,104
[45] Date of Patent: Oct. 22, 1991

[54] ROTARY HEAD DEVICE WITH SIX HEAD UNITS

[75] Inventors: Shoji Kitaori, Kawasaki; Shigeo Kizu, Yokohama, both of Japan

[73] Assignee: Kabushiki Kaisha Toshiba, Kawasaki, Japan

[21] Appl. No.: 558,428

[22] Filed: Jul. 27, 1990

[30] Foreign Application Priority Data

| Jul. 28, 1989 | [JP] | Japan | 1-195691 |
| Jul. 28, 1989 | [JP] | Japan | 1-195693 |
| Sep. 28, 1989 | [JP] | Japan | 1-250441 |
| Apr. 18, 1990 | [JP] | Japan | 2-102631 |

[51] Int. Cl.$^5$ .............................................. G11B 15/60
[52] U.S. Cl. .......................... 360/130.24; 360/130.22; 360/84
[58] Field of Search ................ 360/84, 130.22, 130.24, 360/107, 102, 81, 121, 114

[56] References Cited

U.S. PATENT DOCUMENTS

| 4,686,597 | 8/1987 | Johnston | 360/130.24 |
| 4,719,528 | 1/1988 | Sato | 360/130.24 |

FOREIGN PATENT DOCUMENTS

| 4615871 | 4/1967 | Japan | 360/121 |
| 60-175241 | 9/1985 | Japan | 360/130.24 |

OTHER PUBLICATIONS

IEEE Transactions on Magnetics, vol. Mag-13, No. 5, Sep. 77, "An Analysis for the Magnetization Mode for High Density Magnetic Recording", by Iwasaki et al.

Primary Examiner—David J. Severin
Assistant Examiner—Alfonso Garcia
Attorney, Agent, or Firm—Oblon, Spivak, McClelland, Maier & Neustadt

[57] ABSTRACT

A rotary head device for a recording and reproducing apparatus includes a rotary drum and a stationary drum. The rotary drum has a guide surface formed of a conical surface coaxial with the axis of rotation of the rotary drum and wound with a magnetic tape. A head unit is mounted on the rotary drum to be rotatable integrally therewith. The head unit includes two head elements facing each other, for scanning the tape wound on the guide surface, while the tape is being interposed between the head elements, as the rotary drum rotates.

12 Claims, 16 Drawing Sheets

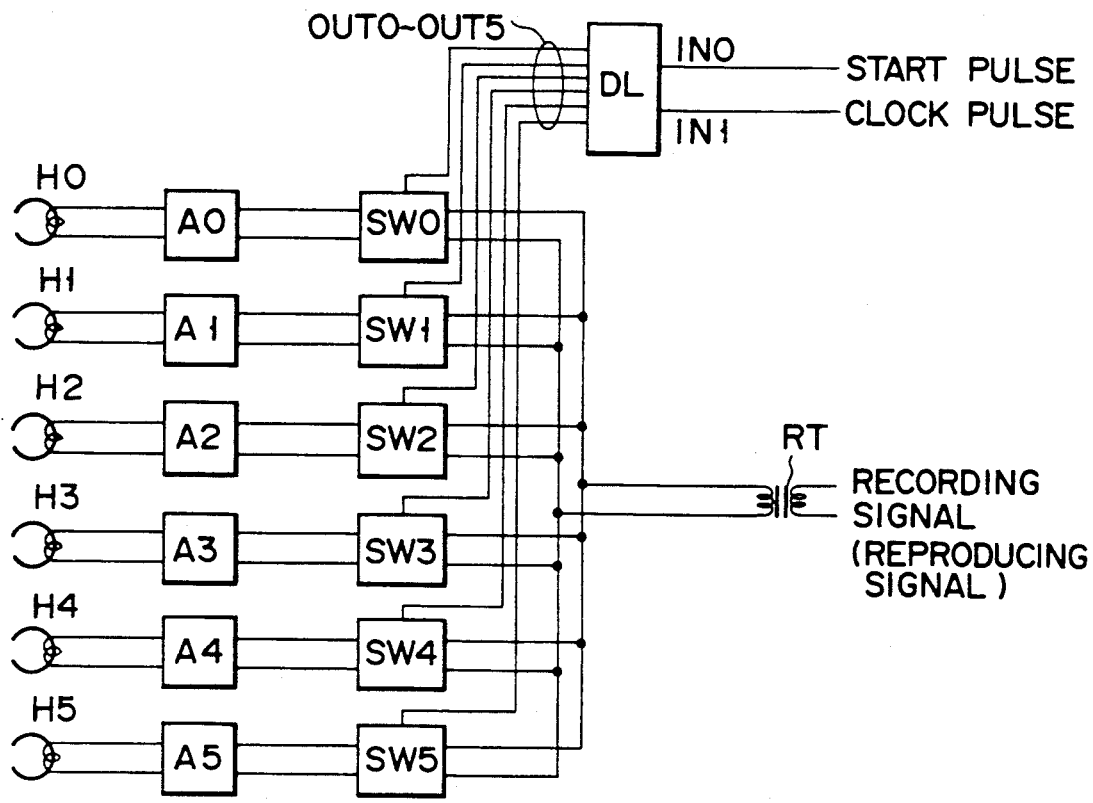
F I G. 12
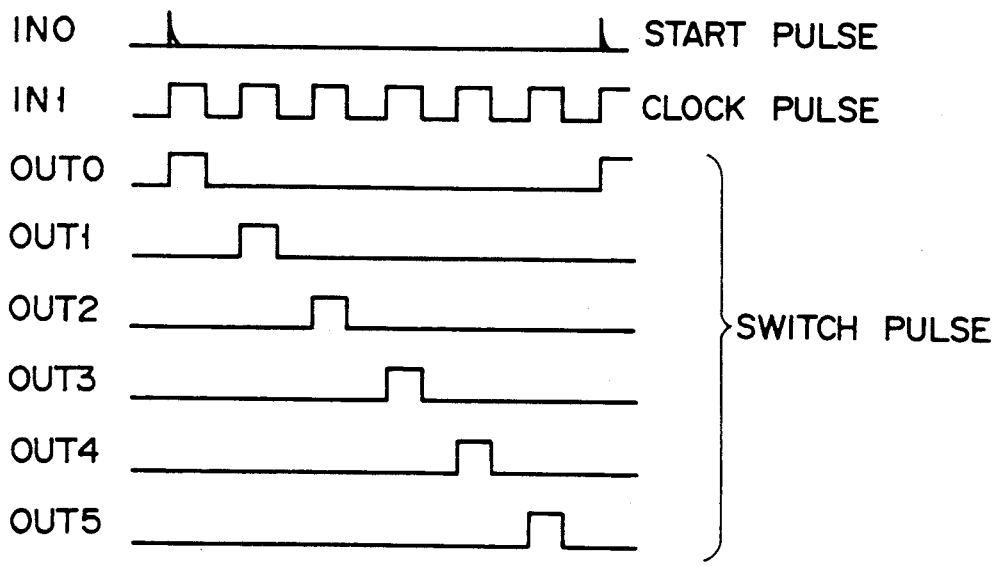
F I G. 13

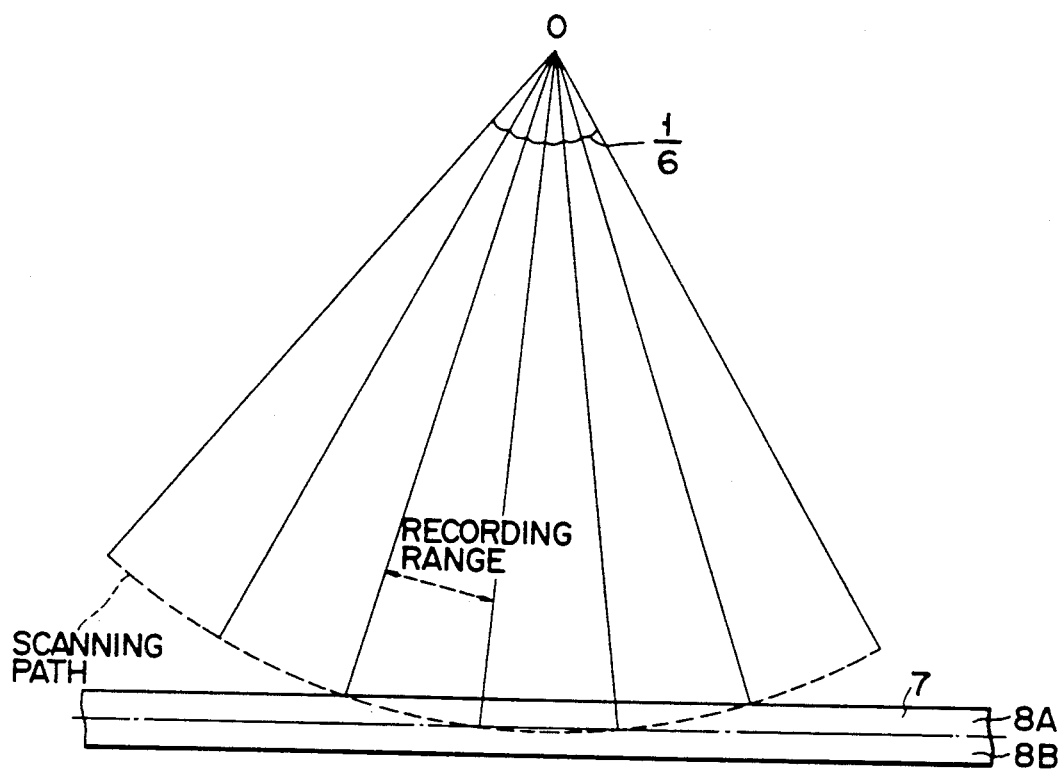
F I G. 14

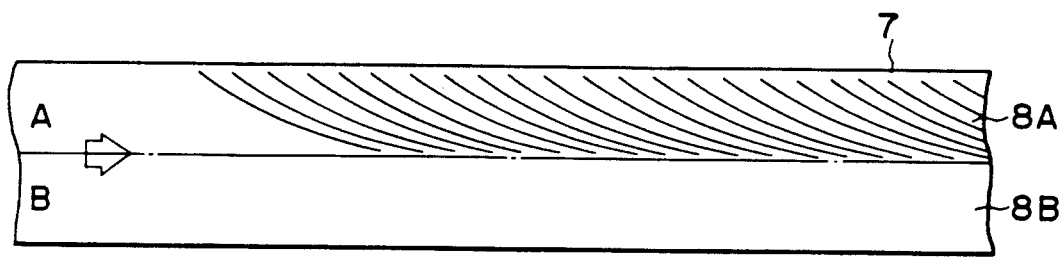
F I G. 15A
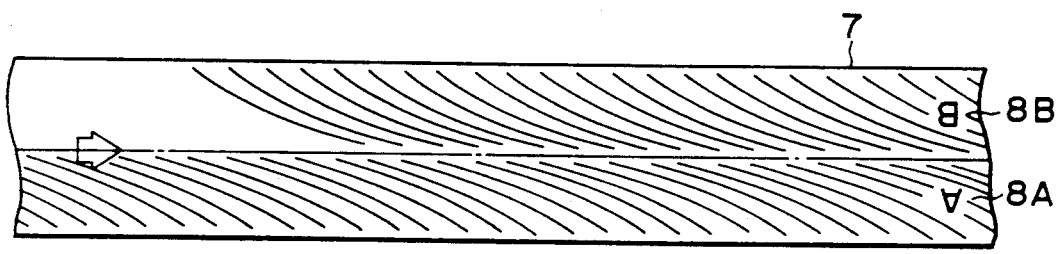
F I G. 15B
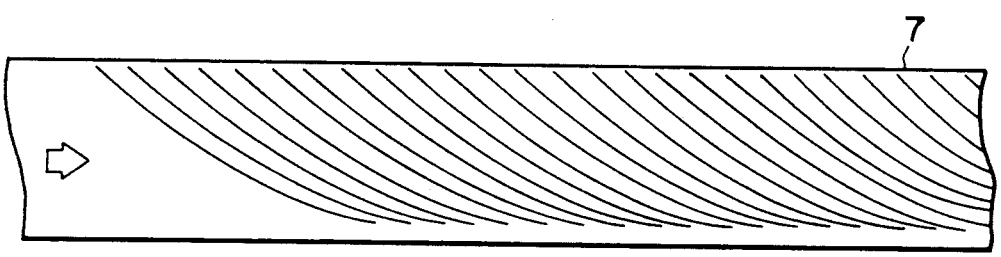
F I G. 16

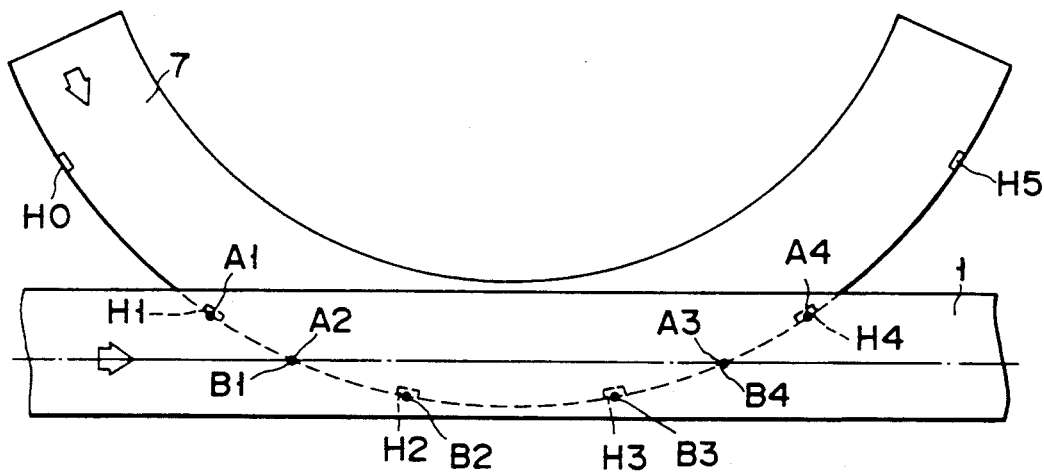
F I G. 20
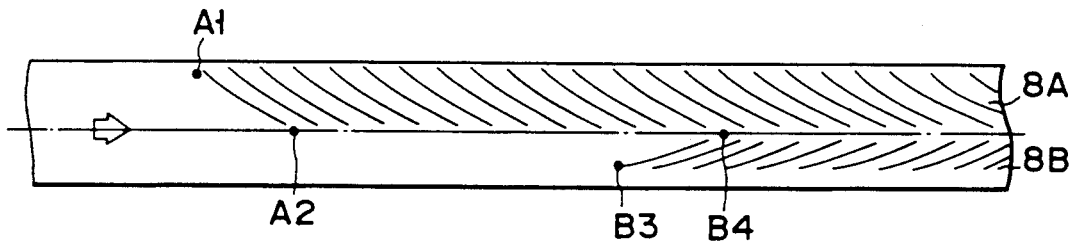
F I G. 21A
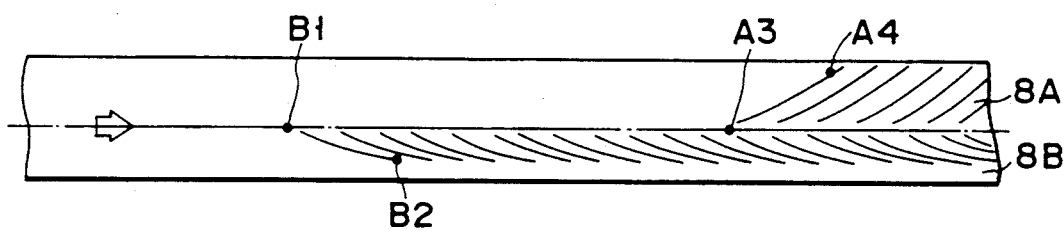
F I G. 21B

ROTARY HEAD DEVICE WITH SIX HEAD UNITS

BACKGROUND OF THE INVENTION

1. Field of the Invention

The present invention relates to a rotary head device for a recording and reproducing apparatus used for recording and reproducing video or audio signals.

2. Description of the Related Art

In high-density recording using a magnetic recording and reproducing apparatus, narrow tracks on a recording medium must be scanned at high density by means of a magnetic head. In a recording and reproducing apparatus which uses a magnetic tape as the recording medium, the tape is generally subjected to helical scanning as a reliable, high-speed scanning method.

The recording and reproducing apparatus, employing the helical scanning method, is provided with a rotary head device. The head device mainly comprises a columnar rotary drum, a magnetic head mounted thereon, and a columnar stationary drum coaxial with the rotary drum. The magnetic tape is run in its longitudinal direction in a manner such that it is wound around the respective peripheral surfaces of the two drums at an angle to the axis thereof. At the same time, the magnetic head is rotated together with the rotary drum at high speed. Thus, the magnetic tape is obliquely scanned at high speed by means of the magnetic head. In this case, a scanning path formed on the tape while the single magnetic head makes one revolution starts at one side edge of the tape and terminates at the other. Part of the scanning path between its starting and terminating points is used for recording or reproducing.

Presently, the helical scanning method is widely used in video tape recorders (VTR) for teaching and home use, digital audio tape recorders (DAT) of the rotary-head type.

The in-surface magnetic recording system is a modern practical magnetic recording system. According to this system, a magnetic layer of a magnetic recording medium is horizontally magnetized by means of a ring-shaped magnetic head. This recording system is also used in a recording and reproducing apparatus of the rotary-head type, represented by the aforesaid helical scanning system. However, the in-surface magnetic recording system is subject to a so-called self-demagnetizing effect such that adjacent magnetic domains on the magnetic tape cancel one another. If the width of the magnetic domains on the tape is reduced to increase the linear recording density, the self-demagnetizing effect is enhanced in proportion. Thus, this effect constitutes a primary factor to restrict the recording density.

Meanwhile, a vertical magnetic recording system was proposed in 1977 by S. Iwasaki et al. According to this system, a linear recording density much higher than in the case of the in-surface magnetic recording system is achieved by vertically magnetizing a recording medium by means of a head for vertical magnetic recording (S. Iwasaki et al., IEEE Transaction on Magnetics, MAG-13.5, p. 1,272 (1977)). The head for vertical magnetic recording, which is composed of two magnetic poles, main and auxiliary poles, scans the recording medium while the medium is held between the two poles. With use of this head, the magnetic recording medium can be magnetized in the direction perpendicular to its surface. Accordingly, adjacent magnetic domains of the recording medium enhance the intensity of one another, so that self-demagnetization cannot be caused. Thus, the higher the recording density, the higher the efficiency will be. The head for vertical magnetic recording of this type, which is called a single-pole head of an auxiliary pole excitation type, is one of magnetic heads best suited for the vertical magnetic recording system.

There is an urgent demand for high-density recording especially in the field of VTRs which, among other recording and reproducing apparatuses requiring high recording density, handle video signals which essentially contain a large amount of information. Thus, the vertical magnetic recording system is intensely required to be applied to the VTRs. When using the head for vertical magnetic recording, such as the single-pole head of the auxiliary pole excitation type, in a VTR, however, high-speed scanning must be effected in a manner such that the magnetic tape is held between the two magnetic poles. It is very difficult, therefore, to apply the head for vertical magnetic recording to the conventional helical scanning system.

Let it be supposed that the head for vertical magnetic recording is positively applied to the helical scanning system. In this case, a head element supported on the rotary drum by means of a head supporting member may be opposed to another head element fixed to the rotary drum so that these two head elements are used individually as the two magnetic poles These head elements, along with the rotary drum, may be rotated at high speed, whereby the magnetic tape is scanned so that it is held between the two head elements. In the case of the helical scanning system, the magnetic tape is wound around the rotary drum at an angle to the axis of the drum, so that the head elements can scan the magnetic tape from the upper edge side thereof to the lower edge side. While the rotary drum is making one revolution, however, the junction of the head supporting member and the rotary drum is bound to be in contact with the upper side edge of the tape. If the drum is rotated in this state, the magnetic tape is inevitably brought into contact with the supporting member, so that it cannot travel smoothly. This is an essential problem which cannot be avoided however long the supporting member, compared with the width of the magnetic tape, may be or even though the way of winding the tape on the rotary drum is changed. Thus, it is very difficult to perform the vertical magnetic recording by combining the head for vertical magnetic recording with the helical scanning system.

The photomagnetic recording system is another recording system of which ultrahigh-density recording can be expected. This system is already in the stage of practical use in the case where a disk is used as the recording medium. In a typical photomagnetic recording and reproducing apparatus using a disk-shaped recording medium, a photomagnetic disk is rotated at high speed by means of a spindle motor. An optical head and a magnetic head are arranged facing each other with the photomagnetic disk between them. The magnetic head, which is used to generate a magnetic field, magnetizes the surface of the photomagnetic disk. The optical head is provided with a laser beam source, optical system, photodetector, etc. At the time of recording operation, the optical head applies heat to a recording region from the rear side of the disk, thereby selectively subjecting a facing portion of the disk to a magnetic reversal. At the time of reproducing operation, moreover, the optical head detects the polarization angle (Kerr rotational angle) of a laser beam reflected by the disk, and fetches a regenerative signal.

Photomagnetic recording can be effected by means of this arrangement when the disk-shaped recording medium is used. When the photomagnetic recording is applied to the helical scanning system using a tape-shaped recording medium, however, the recording medium must be held between the optical head and the magnetic head, thus arousing the same problem as in the case of the vertical magnetic recording.

As described above, the helical scanning system used in the conventional recording and reproducing apparatus of the rotary-head type is an outstanding system in which a flexible tape-shaped recording medium can be scanned relatively stably and with high density. It is very difficult, however, to apply this system to the vertical magnetic recording system or photomagnetic recording system in which the recording medium is held between two heads for recording or reproducing, since the medium will interfere with the head supporting member for holding one of the rotating heads.

SUMMARY OF THE INVENTION

The object of the present invention is to provide a rotary head device of a recording and reproducing apparatus capable of stable, high-density recording and reproducing.

In order to achieve the above object, a rotary head device according to the present invention comprises a rotary drum and at least one head unit mounted on the rotary drum so as to be rotatable integrally therewith. The rotary drum has a guide surface formed of a conical surface coaxial with the axis of rotation of the rotary drum. A tape-shaped recording medium is run in a manner such that it is wound on the guide surface. The head unit includes two head elements facing each other across the recording medium on the guide surface and adapted to scan the recording medium as the rotary drum rotates.

According to the device constructed in this manner, a vertical magnetic recording system or photomagnetic recording system can be realized. In the former system, a main magnetic pole and an auxiliary magnetic pole for vertical magnetic recording are used individually as the two head elements which face each other across the recording medium. In the latter system, an optical head and a magnetic head for photomagnetic recording are used as the head elements.

When the tape-shaped recording medium is run in its longitudinal direction as it is wound on the conical guide surface of the rotary drum, the scanning paths of the head elements on the recording medium start and terminate at one and the same side edge of the medium while the drum makes one revolution. Since the guide surface of the rotary drum is conical, the tape-shaped recording medium coils around the guide surface so as to advance from the side of a large-diameter second end edge of the guide surface toward a small-diameter first end edge, changes its course and advances again toward the second end edge, and then leaves the guide surface on the second edge side. While it is traveling on the guide surface of the rotary drum in this manner, the recording medium passes between the two head elements, whereupon the scanning paths are formed on the recording medium.

Even though the rotary drum is provided with a supporting member for supporting one of the head elements, therefore, the recording medium can stably travel on the guide surface of the drum without interfering with the supporting member. Thus, the recording medium can enjoy a reliable travel between the two head elements, thereby ensuring high-density recording or reproducing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 21B show a rotary head device according to a first embodiment of the present invention, in which FIG. 1 is a perspective view of the head device, FIG. 2 is an exploded perspective view of the head device, FIG. 3 is a side view of the head device, FIG. 4 is a longitudinal sectional view of the head device, FIG. 5 is a side view schematically showing the head device and a recording and reproducing apparatus using the same, FIG. 6 is a plan view corresponding to FIG. 5, FIG. 7 is a developed plan view showing a rotary drum and a magnetic tape wound thereon, FIG. 8 is a developed side view showing the rotary drum and the magnetic tape wound differently from the case of FIG. 7, FIGS. 9A to 9D are side views showing positional relationships between various parts in a state such that a head unit is rotated to angular positions A to D shown in FIG. 2, respectively, FIG. 10 is an enlarged perspective view showing a projecting portion of a stationary drum, FIG. 11 is a side view schematically showing a mechanism for separating the magnetic tape, FIG. 12 is a diagram showing a recording and reproducing circuit, FIG. 13 is a timing chart for illustrating the operation of the recording and reproducing circuit, FIG. 14 shows a development of a scanning path of a head element associated with the recording and reproducing circuit of FIG. 12, FIG. 15A is a plan view showing a track pattern formed on one region of the magnetic tape, FIG. 15B is a plan view showing track patterns formed on both regions of the magnetic tape, FIG. 16 is a plan view showing a track pattern obtained when the magnetic tape used is not divided into two regions, FIG. 17 is a diagram showing another recording and reproducing circuit, FIG. 18 is a timing chart for illustrating the operation of the second recording and reproducing circuit, FIG. 19 shows a development of a scanning path of a head element associated with the recording and reproducing circuit of FIG. 17, FIG. 20 is a plan view showing the scanning path of the head element on the recording medium, along with the developed rotary drum, FIG. 21A is a plan view showing track patterns formed on two regions of the magnetic tape, and FIG. 21B is a plan view showing alternative track patterns formed on both regions of the magnetic tape;

FIGS. 22 to 29 show a rotary head device according to a second embodiment of the invention, in which FIG. 22 is a longitudinal sectional view of the head device, FIG. 24 is a perspective view of a head unit, FIG. 24 is a block diagram of a moving coil control circuit, FIG. 25 is a plan view of a track pattern obtained when head elements are fixed, FIG. 26 is a plan view of a track pattern obtained when the head elements are shifted, FIG. 27 is a plan view showing a difference in distance between an arcuate track and a straight track, FIG. 28 is a diagram showing the relationship between the rotational angle of the head elements and the difference in distance, and FIG. 29 is a diagram showing the relationship between unit time and a control signal;

DETAILED DESCRIPTION OF THE PREFERRED EMBODIMENTS

Figure 1:
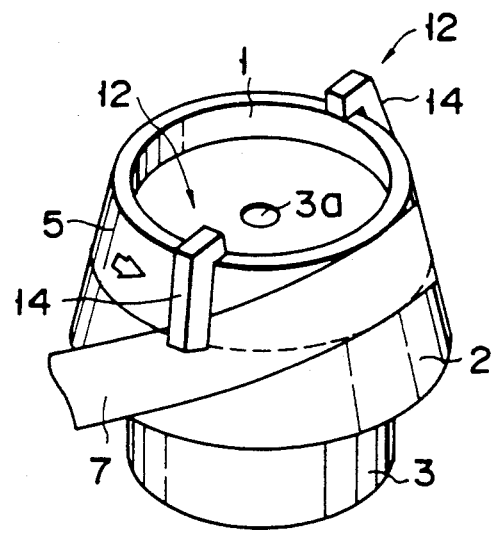

Preferred embodiments of the present invention will now be described in detail with reference to the accompanying drawings.

FIGS. 1 to 4 show a rotary head device of a recording and reproducing apparatus according to a first embodiment of the invention.

The rotary head device comprises a rotary drum 1, a stationary drum 2 on the bottom side of the drum 1, and a drum motor 3 for rotating the drum 1. The rotary drum 1 has the shape of a truncated cone. The outer peripheral surface of the drum 1 forms a conical guide surface 5, on which is wound a magnetic tape 7 for use as a recording medium.

The stationary drum 2, which also has the shape of a truncated cone, is coaxial with the rotary drum 1. The diameter of the top portion of the drum 2 is equal to that of the bottom portion of the drum 1. Thus, the outer peripheral surface of the stationary drum 2 forms a conical surface which is continuous with the outer peripheral surface of the rotary drum 1. This conical surface constitutes part of a guide surface on which the magnetic tape 7 is wound.

Figure 5:
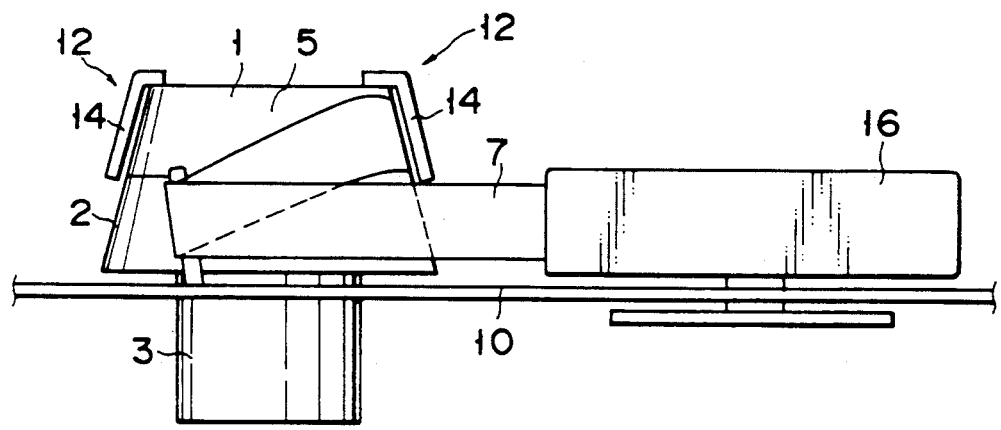

The motor 3 is located under the stationary drum 2, and its rotating shaft 3a penetrates the drum 2 to be coaxially connected to the rotary drum 1. As shown in FIG. 5, moreover, the motor 3 is fixed together with the drum 2 to a base plate 10 of the recording and reproducing apparatus.

The rotary drum 1 is fitted with a plurality of head units 12, e.g., six in number, which are arranged at regular intervals in the circumferential direction of the drum 1 so as to be rotatable integrally therewith. Only two of the head units are illustrated in the drawings. Each unit 12 includes first and second head elements 4 and 6. The first head element 4 is fixed to a large-diameter end edge or bottom edge 1b of the rotary drum 1 so as to project for a short distance d from the guide surface 5. The second head element 6 is fixed to the drum 1 by means of a supporting arm 14. The arm 14 extends parallel to the guide surface S with a gap between them, and its upper end portion is fixed to a small-diameter end edge or top edge 1a of the drum 1. The second head element 6 is fixed to the lower end of the arm 14 so as to face the first head element 4 at a given distance therefrom. Disposed in the rotary drum 1 is a rotary transformer 20 for electrically connecting the head elements 4 and 6 to an electric circuit (described latter).

In this embodiment, the first and second head elements 4 and 6 of each head unit 12 constitute a magnetic head for vertical magnetic recording (single-pole head of the auxiliary pole excitation type). One of these head elements is formed of a main magnetic pole, while the other is formed of an auxiliary magnetic pole. When the photomagnetic system is used, the two head elements are formed of an optical head and a magnetic head for generating a magnetic field, respectively.

Figure 2:
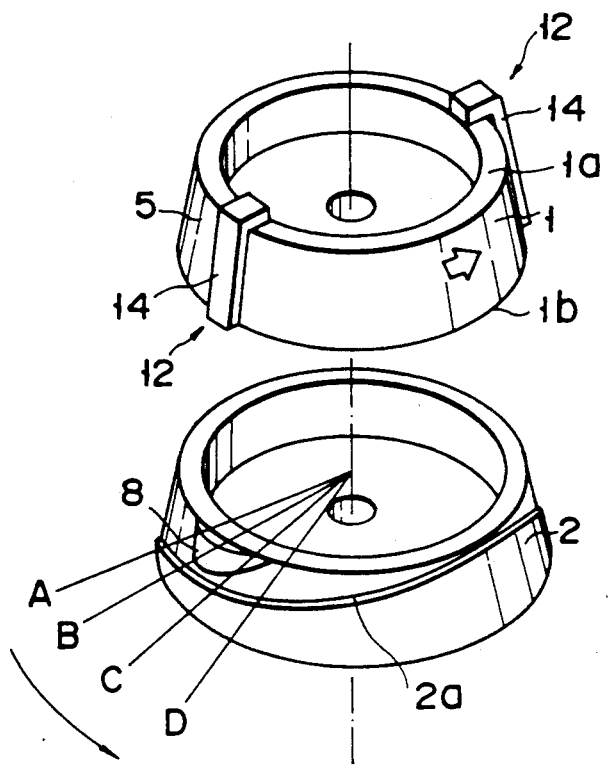
Figure 3:
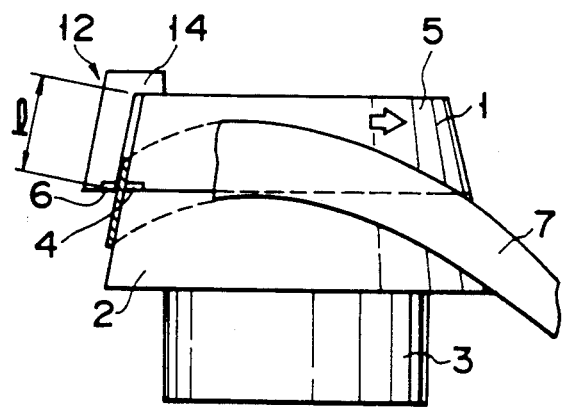
Figure 4:
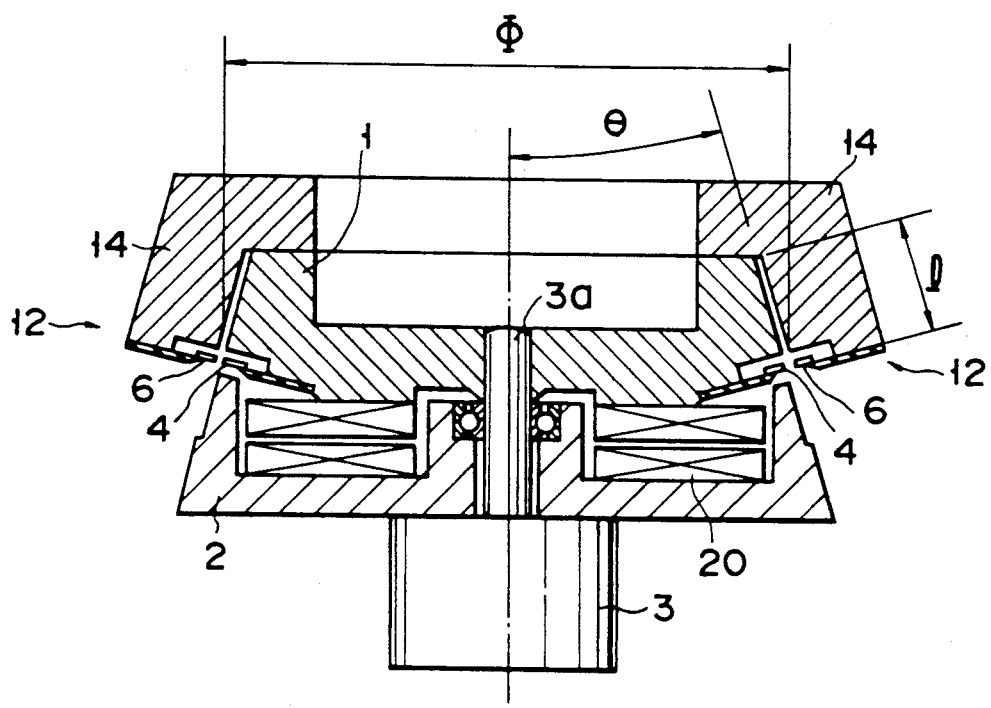

As seen from FIG. 2, moreover, an arcuate projection 8 protrudes integrally from the outer peripheral surface of the stationary drum 2. The projection 8 is formed in the vicinity of the top edge of the drum 2, and is situated just short of the point of intersection of the upper side edge of the magnetic tape 7 and the bottom edge of the rotary drum 1, at the region where the tape 7 starts to be wound around the drum 1. A stepped portion 2a is formed on the outer peripheral surface of the stationary drum 2 so that the lower side edge of the tape 7 on the drums 1 and 2 engages the portion 2a to be positioned with respect to the drums.

Figure 6:
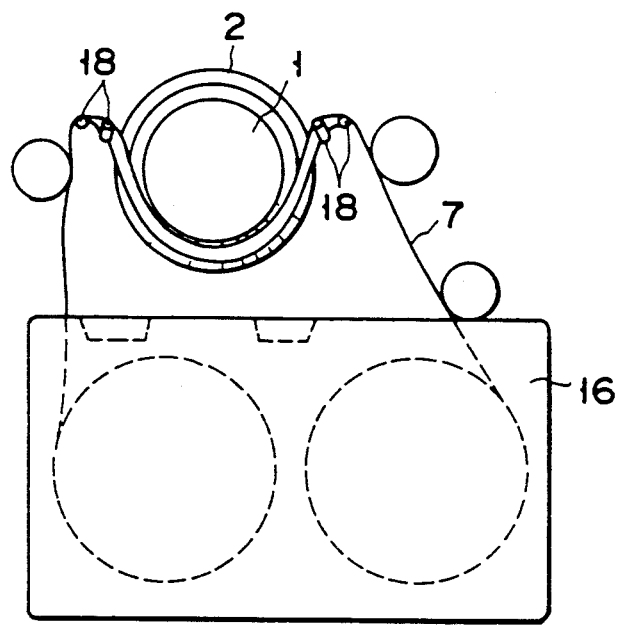

As shown in FIGS. 5 and 6, the rotary head device constructed in this manner is located so that the central axis of the stationary drum 2 extends perpendicular to the base plate 10 of the recording and reproducing apparatus. The magnetic tape 7 is drawn out from a tape cassette 16 in the recording and reproducing apparatus by means of a set of loading posts 18 of a loading mechanism, and is wound around the rotary drum 1 and the stationary drum 2 of the rotary head device. Since the outer peripheral surface of each drum is a conical surface, the magnetic tape 7 starts to be wound around the drums 1 and 2 from the bottom edge side of the drum 1, changes its course after advancing to the top edge side of the drum 1, and then advances from the top edge side toward the bottom edge side of the drum 1, as seen from FIGS. 1, 3 and 5. Finally, the tape 7 is separated from the respective outer peripheral surfaces of the drums 1 and 2. Thus, the upper side edge of the magnetic tape 7 is wound around the drums 1 and 2 without intersecting the top edge 1a of the rotary drum 1. At this time, the lower side edge of the tape 7 is set on the stepped portion 2a of the stationary drum 2, so that the tape 7 can be located in a predetermined position relative to the drums 1 and 2.

As it is wound around the drums 1 and 2, the magnetic tape 7 is run in its longitudinal direction by means of a tape running mechanism (not shown) of the recording and reproducing apparatus. At the same time, the rotary drum 1, along with the head units 12, is rotated at high speed by means of the motor 3. Thus, the head elements 4 and 6 of each head unit 12 scan the wound magnetic tape 7 from both sides thereof at high speed, thereby recording information signals, such as video or audio signals, on the tape, or reproducing information on the tape.

Figure 7:
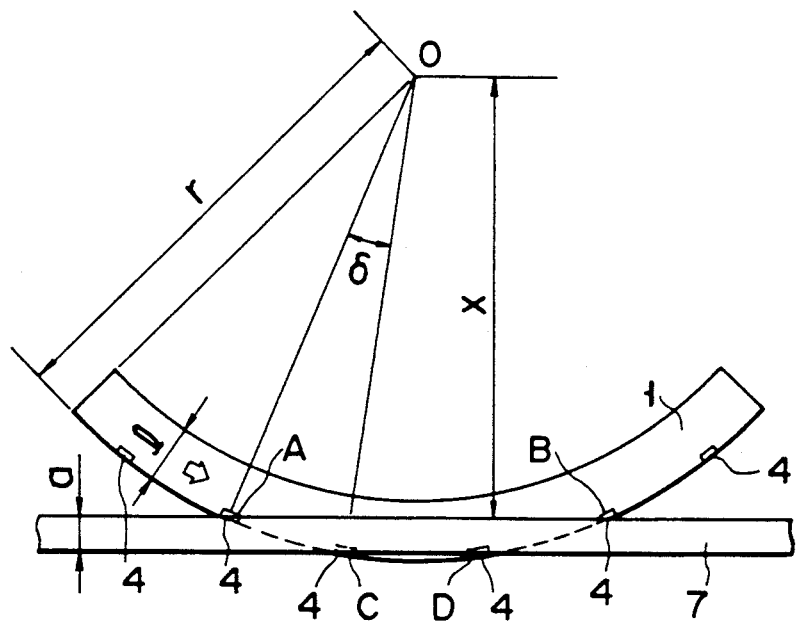

Since the respective outer peripheral surfaces of the drums 1 and 2 are conical, the scanning paths of the head elements 4 and 6 on the tape extend as shown in FIG. 7, for example. In FIG. 7, the guide surface 5 and the magnetic tape 7 thereon, along with the head element 4, are shown developed. In this drawing, the guide surface 5 is fan-shaped, and the head element 4 is situated on the lower edge of the surface 5, that is, on the outer peripheral edge of the sector. Thus, as the rotary drum 1 rotates, the head element 4 moves on the outer peripheral edge of the sector, thereby scanning the magnetic tape 7 along an arcuate path.

Here let it be supposed that the traveling speed of the magnetic tape 7, with respect to its longitudinal direction, is very much lower than the scanning speed of the head element 4 which is attributable to the rotation of the drum 1, as is generally the case with the device of this type (e.g., traveling speed of several centimeters per second or less, compared with the scanning speed of several meters per second or more). In this case, the scanning path of the head element 4 starts at point A, where the outer periphery of the sector along which the head element moves and the upper side edge of the tape 7 intersects, and terminates at point B on the same upper side edge. The recording or reproducing of the information signals is effected using the whole or part of the scanning path between points A and B. The scanning path of the head element 6 on the magnetic tape 7 resembles that of the head element 4.

In the present embodiment, the head elements 4 and 6 are designed so that they are disengaged from the magnetic tape 7 so as not to scan the tape between points C and D which are situated halfway between points A and B. This arrangement is used for the following reason. Since the scanning paths of the head elements 4 and 6 are arcuate, the scanning direction of the elements between points C and D is substantially parallel to the longitudinal direction of the magnetic tape 7. Accordingly, track pitches at this section are so short that the recording density cannot be easily increased. Preferably, therefore, part of the section between points A and C and/or the section between points D and B should be used in actual recording or reproducing.

According to the rotary head device constructed in this manner, the respective outer peripheral surfaces of the rotary and stationary drums 1 and 2 are conical. In coiling around these drums, therefore, the magnetic tape 7 advances on the outer peripheral surface of the stationary drum 2 from the bottom edge side thereof to the top edge side, and then advances on the guide surface 5 of the rotary drum 1 from the bottom edge side thereof to the top edge side. Thereafter, the tape 7 passes between the head elements 4 and 6 of the head units 12, changes its course toward the bottom edge side of the guide surface 5, advances to the bottom edge side of the stationary drum 2, and then leaves the outer peripheral surface of the drum 2. Thus, if the length L of each supporting arm 14 is greater than the difference between the radius r of gyration of the head elements 4 and 5 and the distance x from the vertex 0 of the cone containing the drums 1 and 2 to the upper side edge of the magnetic tape 7 (L>r−x), the top edge 1a of the guide surface 5, which is illustrated as the inner peripheral edge of the sector, never crosses the upper side edge of the tape 7. While the magnetic tape 7 travels on the guide surface 5 of the rotary drum 1 in rotation, therefore, the upper end portion of the supporting arm 14, fixed to the top edge 1a of the surface 5, never interferes with the tape 7. Thus, the magnetic tape 7 can stably travel without interfering with the head units 12 even though it is held between the head elements 4 and 6 for the recording or reproducing operation.

The angle of inclination of the guide surface 5 and the diameter of the bottom edge of the rotary drum 1 depend on various design elements, including the number and layout of the head units 12, the effective scanning width on the magnetic tape 7, the angle of tape winding on the drums 1 and 2, etc.

The following is a description of an example of design tried by the inventor hereof in association with the present embodiment.

First, in consideration of the width of the actually used magnetic tape, among the aforementioned various design elements, the effective scanning width a is set to 10 mm, and the angle of tape winding on the rotary and stationary drums 1 and 2 is set to 180° C. lest the tape running mechanism be unduly complicated. For simplicity of an electric signal processing system, the head units 12 are minimized in number and are designed so that only one set of units 12 can always be used to scan the magnetic tape 7. If the head units 12 are six in number and are arranged at regular intervals in the circumferential direction of the rotary drum 1, the effective scanning width a, the distance x from the vertex O of the cone to the upper side edge of the tape 7, and the angle $\rho$ formed between each two adjacent head units 12 around the vertex O are adjusted so as to satisfy the following equation (1):

$$a/x = \frac{\cos \frac{1}{2} \rho}{\cos \frac{3}{2} \rho} - 1 \quad (1)$$

If the angle $\rho$ is wide, the angle of inclination of the guide surface 5 of the rotary drum 1 is too wide to run the magnetic tape 7 smoothly. If the angle $\rho$ is reduced, the outside diameter of the drum 1 increases. In this example, the angle $\rho$ is set to $\rho = 5$. Thus, according to equation (1), the distance x from the vertex O of the cone to the upper side edge of the tape 7 is 136.47 mm. The distance r from the vertex O to the head elements 4 and 6, which is about 148 mm, is given by $$r = \frac{x}{\cos \frac{3}{2} \rho} \quad (2)$$

As mentioned before, the length L of the supporting arm 14 is greater than the difference between r and x. In the example described above, (r−x)=11.53 mm, so that the length L is about 15 mm. If the dimensions of the rotary drum 1 are calculated on the basis of these values, the angle of inclination of the conical surface is about 14.5°, and the diameter of the bottom edge of the drum 1 is about 74 mm. According to this design example, the magnetic tape 7 can be stably run without interfering with the head units 12. The present invention is not limited to this example.

Figure 8:
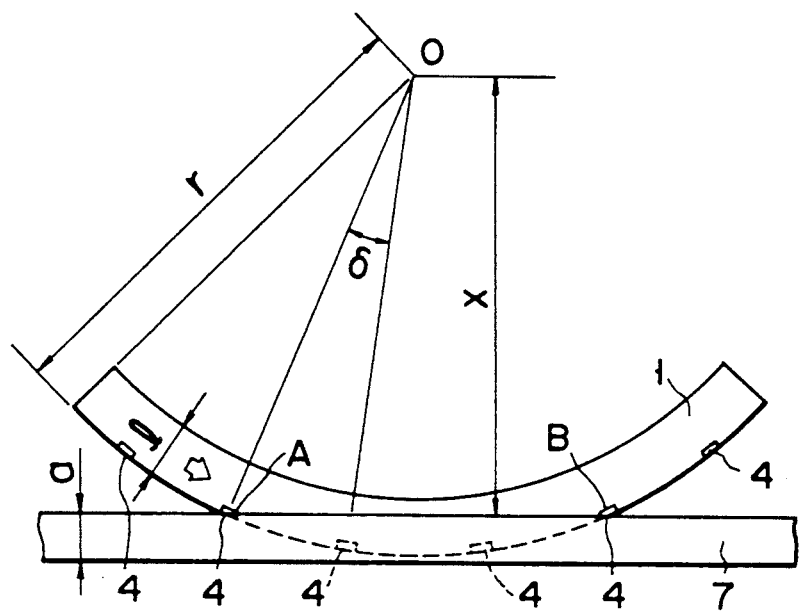

In the embodiment described above, the head elements 4 and 6 are arranged so that their scanning paths are off the magnetic tape 7 at the section between points C and D. Alternatively, however, the head elements may be arranged so that the whole scanning paths between points A and B are on the tape 7, as shown in FIG. 8.

The following is a description of the projection 8 on the stationary drum 2.

First, the reason why the projection 8 is required will be described. In the rotary head device with the aforementioned construction, the first head element 4 of each head unit 12 projects for the distance d from the outer peripheral surface of the rotary drum 1, as mentioned before. The distance d is set to about 30 $\mu$m in order that the magnetic surface of the magnetic tape 7 can be intimately in contact with the head element 4. The space g between the first and second head elements 4 and 6 is set to about 90 $\mu$m in order to obtain a high reproducing output. The thickness of the magnetic tape 7 is about 20 μm. If the head element 4 thus projects from the outer peripheral surface of the rotary drum 1, it runs against the upper side edge of the tape 7 at point A where the bottom edge 1b of the drum 1 crosses the upper side edge of the tape, as shown in FIG. 7. Thus, the magnetic tape 7 cannot be smoothly inserted between the head elements 4 and 6. When it starts to be inserted between the elements 4 and 6, therefore, the tape 7 must be lifted off the outer peripheral surfaces of the drums 1 and 2 for a distance s which is greater than the distance d of projection of the head element 4. If the distance s is greater than the distance $(d+g-t)$ obtained by subtracting the thickness t of the tape 7 from the distance between the outer peripheral surface of the stationary drum 2 and the second head element 6, however, the side edge of the tape 7 runs against the element 6. Also in this case, therefore, the tape 7 cannot be smoothly inserted between the head elements 4 and 6. Thus, the distance s must be given by $d<s<(d+g-t)$, that is, the magnetic tape 7 can be smoothly inserted between the elements 4 and 6 only when this requirement is fulfilled.

If the thickness t of the magnetic tape 7 and the distance d of projection of the head element 4 are 20 μm and 30 μm, respectively, the distance s must be $50\pm 20$ μm in order to adjust the space g between the head elements 4 and 6 to 60 μm. In consideration of the fluctuation of the winding amount, attributable to the delicate change in tension of the tape 7 or the vibration caused by the rotation of the rotary drum 1 and transmitted to the tape 7, however, it is very difficult to restrict the fluctuation of position to an accuracy of $\pm 20$ μm with the tape 7 in contact with nothing.

The above problem can be eliminated by providing the aforementioned projection 8 on the outer peripheral surface of the stationary drum 2, as in the present embodiment. Referring now to FIGS. 9A to 9D, the reason for this solution will be described. FIGS. 9A to 9D show the positional relationships between the magnetic tape 7, rotary drum 1, stationary drum 2, and head elements 4 and 6 in a state such that the head unit 12 is moved to angular positions A to D shown in FIG. 2, respectively.

Figure 9D:
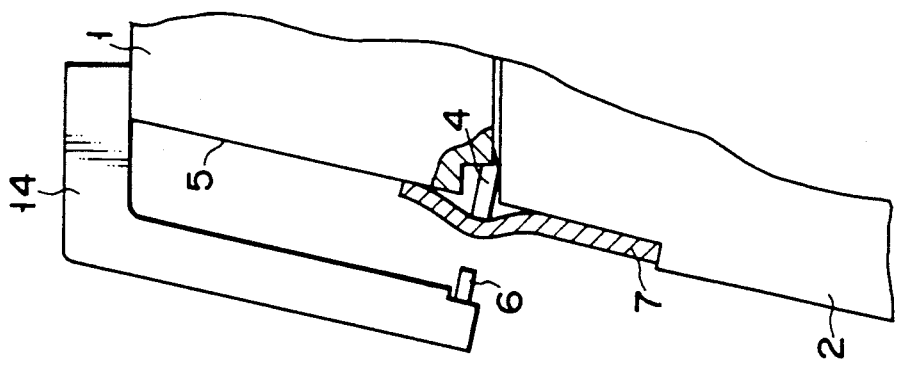
Figure 9C:
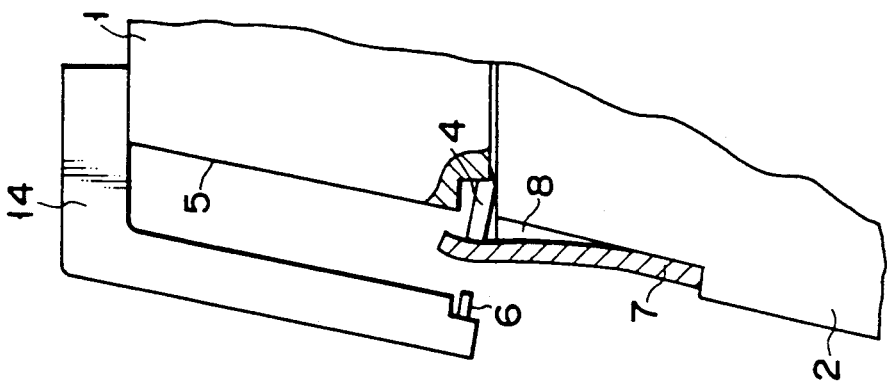
Figure 9B:
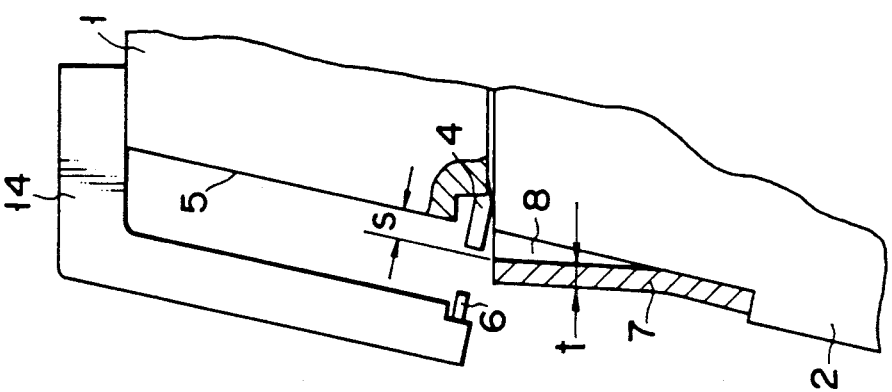
Figure 9A:
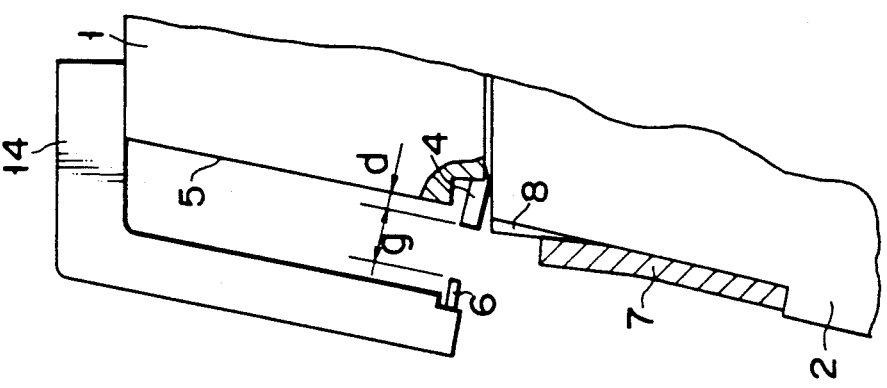

In the position A, as shown in FIG. 9A, the head element 4 is over the projection 8 on the outer peripheral surface of the rotary drum 1, although it is not in contact with the magnetic tape 7. In the position B, as shown in FIG. 9B, the head element 4 is just on the edge of coming into contact with the tape 7. The height s of the projection 8 above the outer peripheral surface of the stationary drum 2 is greater than the distance d of projection of the head element 4, and is shorter than the distance $(d+g-t)$ obtained by subtracting the thickness t of the tape 7 from the distance between the outer peripheral surface of the stationary drum 2 and the second head element 6. In other words, the requirement $d<s<(d+g-t)$ is fulfilled. Thus, the magnetic tape 7 has its upper side edge opposed to the gap between the head elements 4 and 6 in a manner such that it is stably wound around the stationary drum 2.

When the head elements 4 and 6 further rotate to reach the position C, as shown in FIG. 9C, the height of the projection 8 is lowered, so that the magnetic tape 7 smoothly comes into contact with the first head element 4. When the elements 4 and 6 reach the position D where the projection 8 is out of sight, as shown in FIG. 9D, they can start to scan the tape 7.

Thus, the projection 8 is formed on the outer peripheral surface of the stationary drum 2 in the vicinity of the point of intersection of the upper side edge of the magnetic tape 7 on the drums 1 and 2 and the bottom edge of the rotary drum 1. Also, the various members are arranged so that the height s of the projection 8 above the outer peripheral surface of the stationary drum 2, the distance d of projection of the head element 4, the space g between the elements 4 and 6, and the thickness t of the tape 7 have the relation $d<s<(d+g-t)$. In this arrangement, the tape 7 can be smoothly inserted between the two head elements 4 and 6 without having its upper side edge run against the element 4 or 6.

Long before the magnetic tape 7 reaches the position 8 where it starts to be inserted between the head elements 4 and 6, moreover, it is wound on the outer peripheral surface of the stationary drum 2, and is kept in intimate contact with the surface of the projection 8 without being lifted off the surface of the drum 2. Thus, the tape 7 can be stably scanned without being influenced by its vibration caused by the rotation of the rotary drum 1 or the fluctuation of the winding amount.

Figure 10:
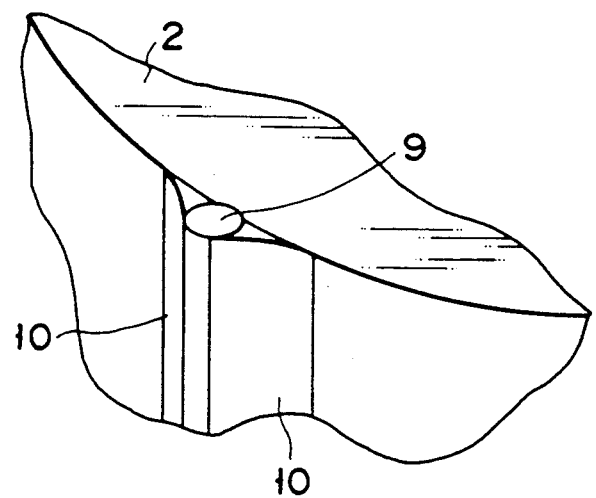

In the present embodiment, the projection 8 with a height of tens of micrometers must be formed on the outer peripheral surface of the stationary drum 2. For example, the projection 8 can be formed in the following manner. FIG 10 is a view for illustrating the method of forming the projection 8. According to this method, a shallow groove is formed on the outer peripheral surface of the stationary drum 2 so as to extend perpendicular to the longitudinal direction of the magnetic tape 7. A nonmagnetic wire 9 of stainless steel or the like, having a suitable diameter of tens of micrometers, is fitted in the groove, and the gap between the wire 9 and the groove is filled up with a bonding agent 10 formed of, e.g., epoxy resin.

With use of this method, the height s of the projection 8 can be easily adjusted to a desired value by suitably selecting the diameter of the nonmagnetic wire 9. The wire 9 may be formed of various other nonmagnetic materials than stainless steel, e.g., aluminum alloy or other metallic materials, fluorine plastics and other plastics, etc., which have suitable harness and smoothness.

Figure 11:
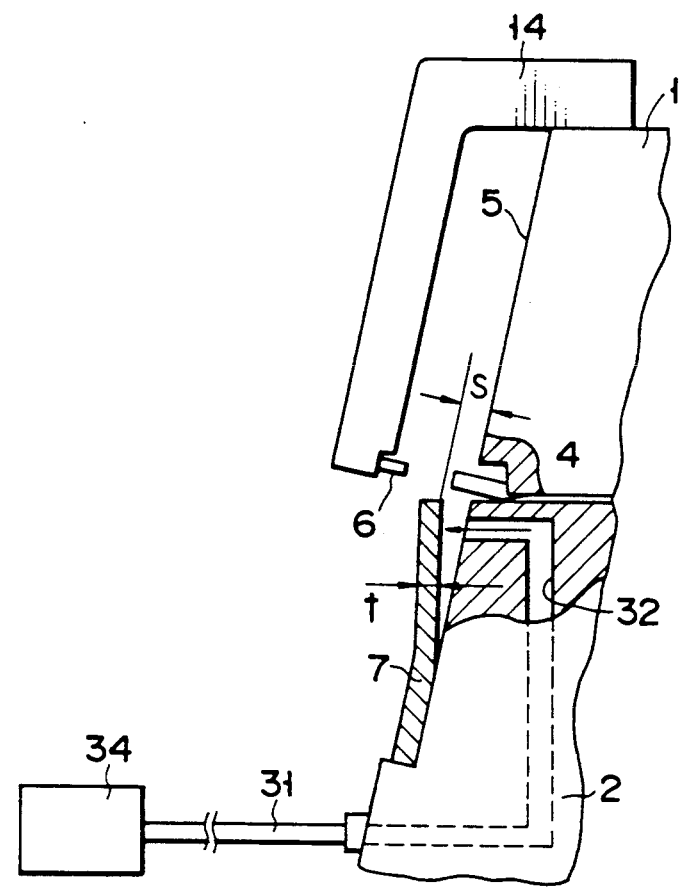

The means for separating the magnetic tape 7 for the given distance from the outer peripheral surface of the stationary drum 2, at the starting position for the scanning of the tape 7 by mean of the head elements 4 and 6, that is, the position where the head elements cross the upper side edge of the tape 7, is not limited to the projection 8 described above, and may alternatively be constructed as shown in FIG. 11. FIG. 11 shows the positional relationships between the various members in a state such that the head elements 4 and 6 are moved to the angular position B of FIG. 2.

According to this modification, a passage 32 is formed in the stationary drum 2, instead of the projection 8 thereon. One end of the passage 32 opens near the position where the magnetic tape 7 starts to be inserted between the head elements 4 and 6, while the other end opens to the bottom edge portion of the drum 2. Also, the other end of the passage 32 is connected to a compressed air source 34 by means of a tube 31. Thus, the tape 7 can be projected from the outer peripheral surface of the stationary drum 2 by blowing air, supplied from the source 34 via the tube 31 and the passage 32, against the tape 7 on the surface of the drum 2. It is to be understood that this arrangement can provide the same effect of the foregoing embodiment.

The following is a description of a recording and reproducing circuit, used to cause the rotary head device with the aforementioned construction to perform the magnetic tape recording or reproducing, and the operation of the circuit.

FIG. 12 shows the recording and reproducing circuit of the device which is provided with six head units H0 to H5. Recording and reproducing amplifiers A0 to A5 are connected to the head elements of the head units H0 to H5, respectively. First ends of switching circuits SW0 to SW5 are connected to the amplifiers A0 to A5, respectively. The circuits SW0 to SW5 are controlled by means of switch pulses from a digital logic circuit DL. The circuit DL operates in response to start pulses and clock pulses externally supplied through a slip ring (not shown). One end side of a rotary transformer RT is connected to the respective other ends of the switching circuits SW0 to SW5. The other end side of the transformer RT is connected to a recording signal generator circuit at the time of recording operation, and to a reproducing signal receiving circuit at the time of reproducing operation.

FIG. 13 is a timing chart showing inputs and outputs of the digital logic circuit DL. One start pulse to be supplied as an input signal IN0 to the circuit DL is generated with every revolution of the rotary drum 1. Six clock pulses to be supplied as input signals IN1 are generated with every revolution of the drum 1, in synchronism with the start pulse. In synchronism with the start pulse, the digital logic circuit DL delivers switch pulses with a regular width, as output signals OUT0 to OUT5, corresponding to the respective leading ends of the clock pulses.

At the time of recording operation, therefore, recording signals are successively supplied to the head elements of the head units H0 to H5 through the switching circuits SW0 to SW5 and recording amplifier sections of the recording and reproducing amplifiers A0 to A5. Thereupon, the signals are recorded on the magnetic tape 7 for one sixth of the whole circumference of the rotary drum 1 at a time by means of the head units H0 to H5. In consequence, the signals are recorded on the tape 7, along the scanning path of each head element indicated by broken line in FIG. 14. In this case, the signals can be recorded only on a upper-half belt-shaped region 8A of the tape 7, as shown in FIG. 15A, by setting the size of the rotary drum 1 and the wounding position (height) of the tape 7 on the drum 1 so that the scanning path is restricted to the region 8A. If similar recording is effected with the opposite side edges of the magnetic tape 7 in reversed relative positions, the signals can be recorded only on a lower-half belt-shaped region 8B (FIG. 14) of the tape 7, as shown in FIG. 15B. A reversible cassette may be used, for example, to reverse the relative positions of the side edges of the tape 7. In reversing the positions, the cassette, containing the tape 7 therein, is taken out of the apparatus, turned over, and reloaded into the apparatus.

At the time of reproducing operation, on the other hand, the switching circuits SW0 to SW5 are controlled by means of the switch pulses in the same manner as aforesaid. Thereupon, signals reproduced by means of the head elements of the head units H0 to H5 are fetched as reproducing signals through the reproducing amplifier sections of the recording and reproducing amplifiers A0 to A5.

In an alternative arrangement, the region of the magnetic tape 7 is not divided, and the scanning path of each head element on the tape 7 starts on the upper side edge side of the tape 7 and extends close to the lower side edge, as shown in FIG. 16, as the rotary drum 1 makes one revolution. In this case, track pitches are relatively wide in the upper-side area of the type 7. In the lower-side area, however, the tracks extend substantially parallel to the longitudinal direction of the tape 7, so that the track pitches are too short for a satisfactory recording or reproducing operation.

According to the recording and reproducing method shown in FIGS. 15A and 15B, in contract with this, the recording or reproducing operation is performed using only one of the belt-shaped regions 8A and 8B of the magnetic tape 7, depending on the traveling direction of tape 7, so that similar track patterns are formed on the two regions 8A and 8B. Accordingly, the recording density (track pitches) is substantially uniform throughout the surface of the tape 7. Thus, the substantially whole surface of the magnetic tape 7 can be used for recording and reproducing, so that the surface recording density can be increased.

Figure 17:
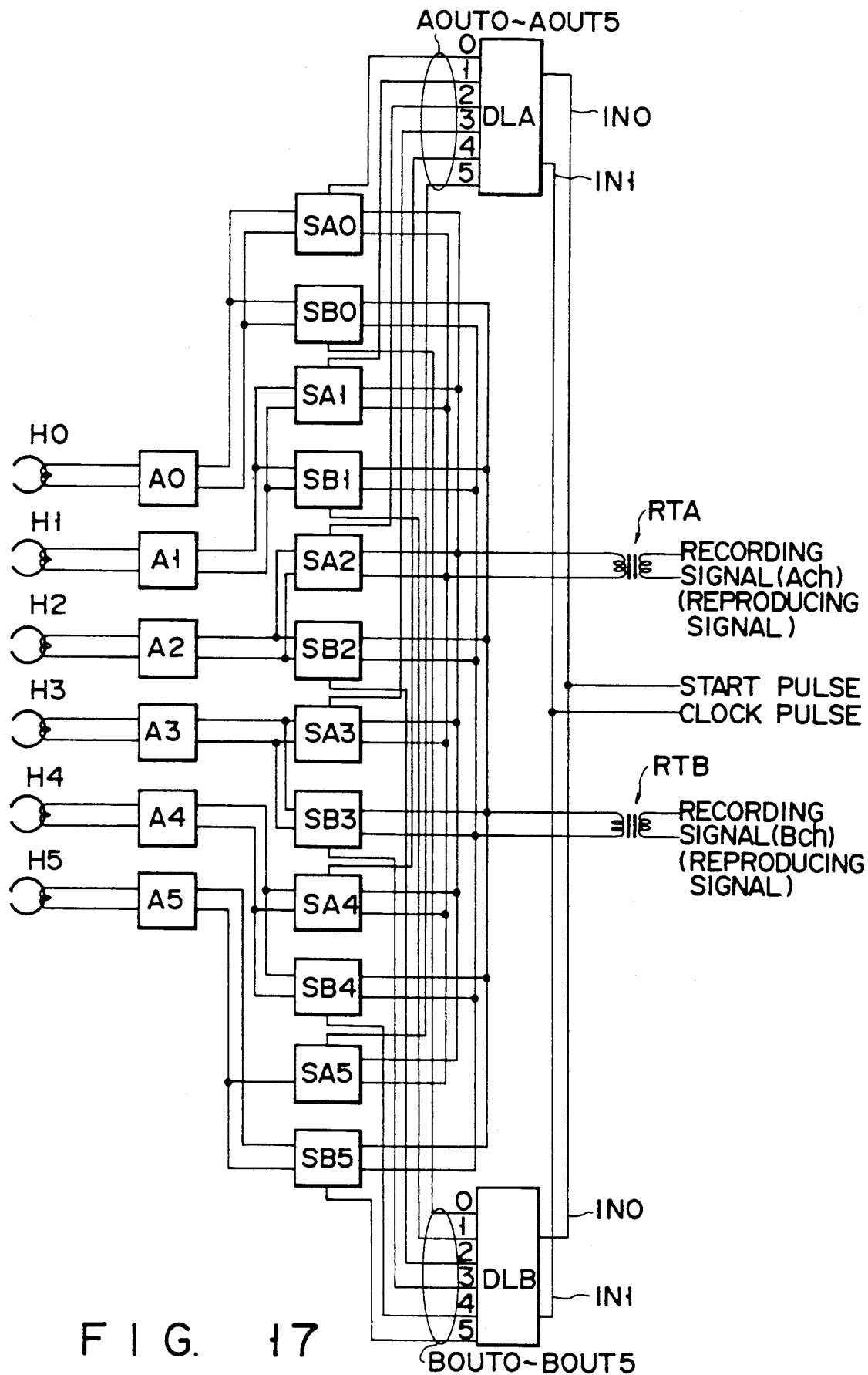

The following is a description of another recording and reproducing method using the rotary head device of the present invention. FIG. 17 shows the recording and reproducing circuit mounted in the rotary drum 1. Like the circuit shown in FIG. 12, the circuit of FIG. 17 is provided with the six head units H0 to H5. The recording and reproducing amplifiers A0 to A5 are connected to the head elements of the head units H0 to H5, respectively. First ends of switching circuits SA0 to SA5 and SB0 to SB5 of channels A and B are connected to the amplifiers A0 to A5, respectively. The circuits SA0 to SA5 are controlled by means of switch pulses from a digital logic circuit DLA, while the circuits SB0 to SB5 are controlled by means of switch pulses from a digital logic circuit DLB. The circuits DLA and DLB operate in response to start pulses and clock pulses externally supplied through a slip ring (not shown). One end side of rotary transformers RTA and RTB is connected to the respective other ends of the switching circuits SA0 to SA5 and SB0 to SB5. The other end side of the transformers RTA and RTB is connected to the recording signal generator circuit at the time of recording operation, and to the reproducing signal receiving circuit at the time of reproducing operation.

Figure 18:
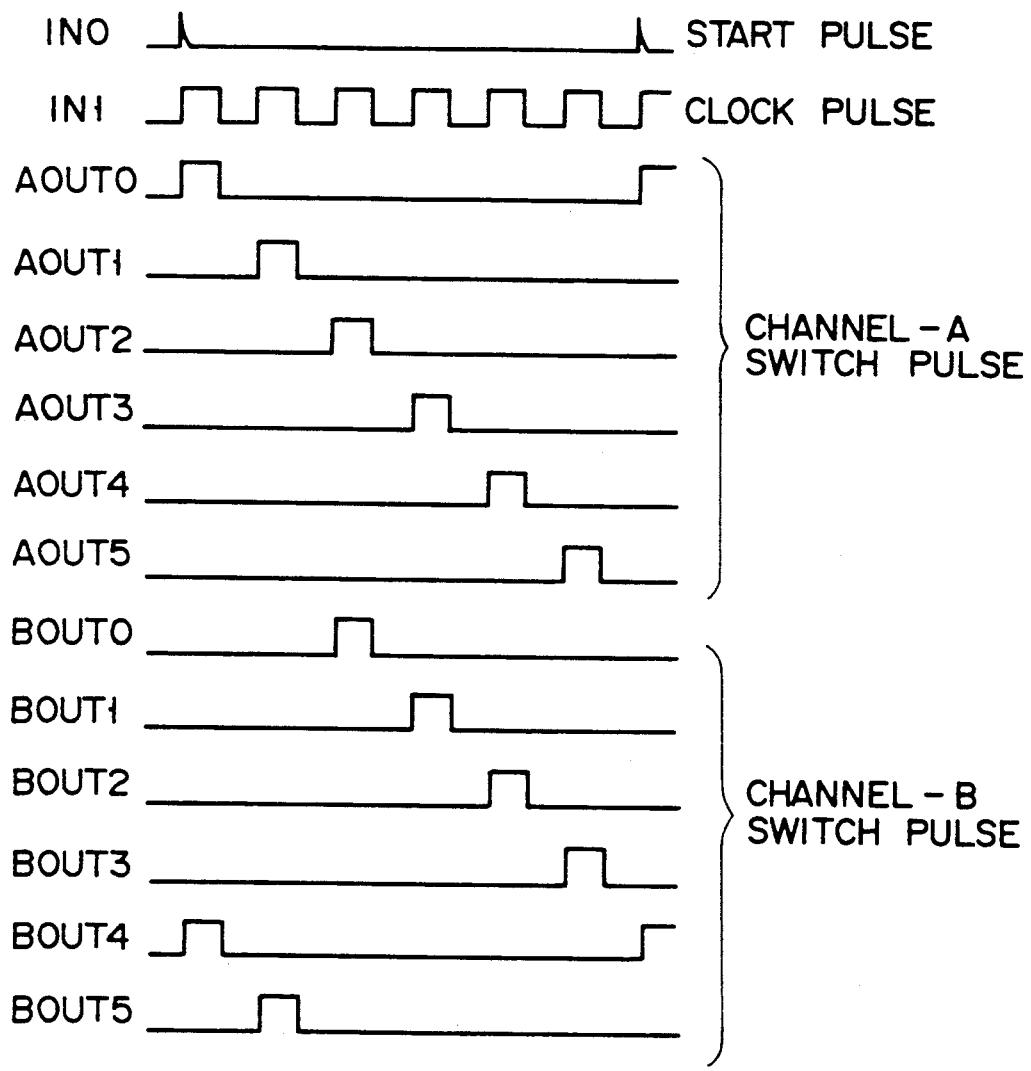

FIG. 18 is a timing chart showing inputs and outputs of the digital logic circuits DLA and DLB. One start pulse to be supplied as an input signal IN0 to the circuits DLA and DLB is generated with every revolution of the rotary drum 1. Six clock pulses to be supplied as input signals IN1 are generated with every revolution of the drum 1, in synchronism with the start pulse. In synchronism with the start pulse, the digital logic circuit DLA delivers switch pulses with a regular width, as output signals AOUT0 to AOUT5, corresponding to the respective leading ends of the clock pulses. Likewise, the digital logic circuit DLB delivers switch pulses with a regular width, as output signals BOUT0 to BOUT5 delayed behind the output signals AOUT0 to AOUT5, respectively, of the circuit DLA, corresponding to the respective leading ends of the clock pulses.

At the time of recording operation, therefore, recording signals of the channel A are successively supplied to the head elements of the head units H0 to H5 through the switching circuits SA0 to SA5 and the recording amplifier sections of the recording and reproducing amplifiers A0 to A5. Also, recording signals of the channel B are successively supplied to the head elements of the head units H0 to H5 through the switching circuits SB0 to SB5 and the recording amplifier sections of the recording and reproducing amplifiers A0 to A5. Thereupon, the signals are recorded on the magnetic tape 7 for one twelfth of the whole circumference of the rotary drum 1 at a time by means of the head units H0 to H5. In consequence, the signals are recorded on the tape 7, along the scanning path of each head element indicated by broken line in FIG. 19. In this case, the signals can be recorded only on a upper-half belt-shaped region 8A of the tape 7, as shown in FIG. 15A, by setting the size of the rotary drum 1, the wounding position of the tape 7, etc. are set so that the scanning path of each head element is formed substantially across the full width of the tape 7.

Figure 19:
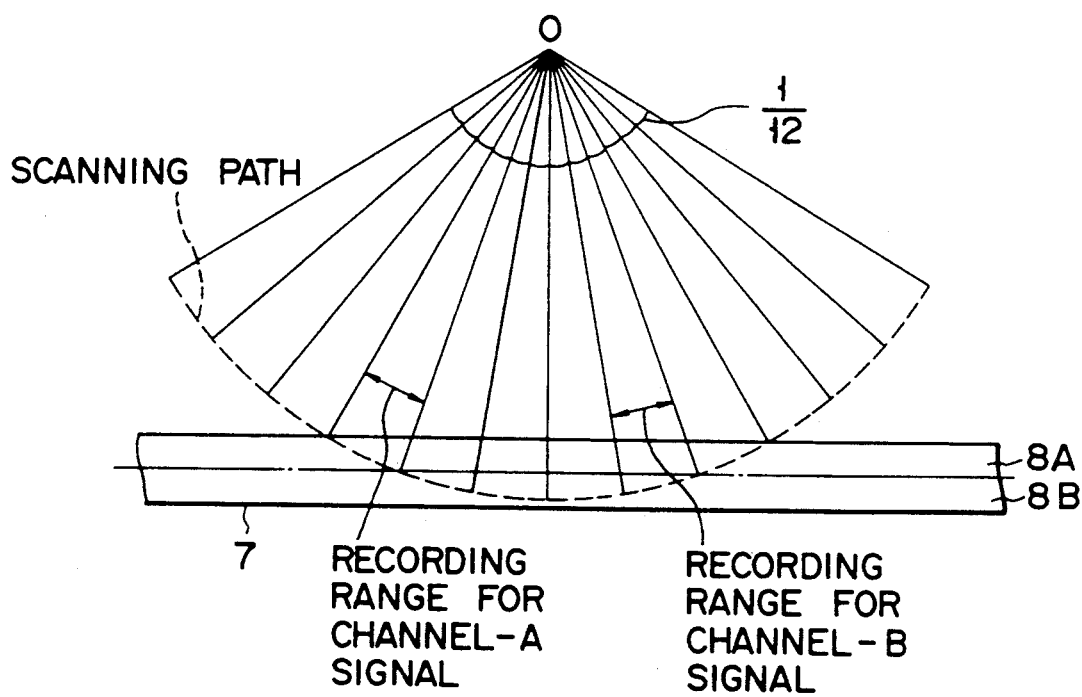

In this case, by suitably shifting the phase of the timing for the supply of the recording signals of the channels A and B to the head elements of the head units H0 to H5, as shown in FIG. 18, the recording signals of the channel A can be recorded on the upper-half belt-shaped region 8A of the magnetic tape 7, and at the same time, the recording signals of the channel B can be recorded on the lower-half belt-shaped region 8B, as shown in FIG. 19.

At the time of reproducing operation, on the other hand, the switching circuits SA0 to SA5 and SB0 to SB5 are controlled by mean of the switch pulses from the digital logic circuits DLA and DLB in the same manner as aforesaid. Thereupon, signals simultaneously retrieved from belt-shaped regions 8A and 8B of the head elements of the head units H0 to H5 are fetched as reproducing signals through the reproducing amplifier sections of the recording and reproducing amplifiers A0 to A5.

FIG. 20 shows the scanning path of the head elements of the head units H0 to H5 along with development of the outer peripheral surface of the rotary drum 1. The head elements of at least two head units, among these six head units H0 to H5, are simultaneously used to scan the magnetic tape 7. In FIG. 20, for example, while the head elements of the head unit H1 are scanning the upper-half belt-shaped region 8A of the tape 7 from point A1 to point A2, the head elements of the head unit H3 scan the lower-half belt-shaped region 8B from point B3 to B4. During this scanning operation, multitrack recording or reproducing can be effected by simultaneously operating the head elements of the head units H1 and H3 by means of the recording and reproducing circuit shown in FIG. 17. In this case, the recording or reproducing is made on the track patterns on the magnetic tape 7 shown in FIG. 21A.

While the head elements of the head unit H1 are scanning the lower-half belt-shaped region 8B of the magnetic tape 7 from point B1 to B2 of FIG. 20, moreover, the head elements of the head unit H3 scan the upper-half belt-shaped region 8A from point A3 to A4. Also during this scanning operation, therefore, multitrack recording or reproducing can be effected by simultaneously operating the head elements of the head units H1 and H3 by means of the recording and reproducing circuit shown in FIG. 17. In this case, the recording or reproducing is made on the track patterns on the magnetic tape 7 shown in FIG. 21B.

According to the rotary head device constructed in this manner, the respective outer peripheral surfaces of the rotary drum and the stationary drum are conical, and the tape-shaped recording medium wound on these outer peripheral surfaces can stably travel without interfering with the head units. Accordingly, a recording and reproducing apparatus of the rotary-head type using a tape-shaped recording medium can be provided employing the ultrahigh-density recording system in which the recording medium is scanned between two head elements, e.g., the vertical magnetic recording system or photomagnetic recording system using the single-pole head of the auxiliary pole excitation type, to which the helical scanning system has not been able to be applied with ease. Thus, the rotary head device of the present embodiment can be highly effectively used in recording and reproducing apparatuses for video signals and the like.

In contrast with the case of the conventional helical scanning system, moreover, the tape-shaped recording medium need not be obliquely wound around the rotary drum. Therefore, the stress on the recording medium is reduced. Further, the rotary drum need not be mounted with a tilt, so that the recording and reproducing apparatus can be simplified in construction and reduced in size.

Furthermore, the projection is formed on the stationary drum in the vicinity of the region where the recording medium faces the head elements, or the means is provided for blowing air against the recording medium on the outer peripheral surface of the stationary drum, at the position where the recording medium starts to be inserted between the two head elements. Accordingly, the tape-shaped recording medium can be smoothly inserted into the narrow gap between the facing head elements without having its side edge run against the head elements. Long before it reaches the position where it is in contact with the head elements, moreover, the recording medium is wound on the outer peripheral surface of the stationary drum so as to be kept stable without being lifted off the drum surface. Thus, the head elements can stably scan the recording medium without being influenced by the vibration of the rotary drum or the fluctuation of the winding amount of the recording medium.

The tape-shaped recording medium is divided into at least two belt-shaped regions arranged side by side, and recording and reproducing are performed using one of the belt-shaped regions. Further, the relative positions of the opposite side edges of the recording medium are reversed so that similar track patterns can be formed on the two regions. Thus, the recording density (track pitches) can be made substantially uniform throughout the surface of the recording medium, so that the surface recording density can be increased.

Furthermore, multitrack recording or reproducing can be effected by simultaneously recording or retrieving signals on or from a plurality of belt-shaped regions on the type by means of the different head elements. Thus, the device of the present embodiment is suited for video reproducing apparatuses which digitize and record or reproduce wide-band video signals, such as high-resolution television signals.

FIGS. 22 to 28 show a rotary head device according to a second embodiment of the present invention. According to this second embodiment, each head unit 12 is located on a rotary drum 1 so that two head elements are movable along the generator generatrix of a guide surface 5 of the drum 1. The head unit is moved for a displacement corresponding to a change of the rotational angle of the rotary drum 1, by means of shifting means. For the arrangement of other elements, this embodiment is constructed in the same manner as the first embodiment. In the description to follow, therefore, like portions are designated by like reference numerals for simplicity.

Figure 22:
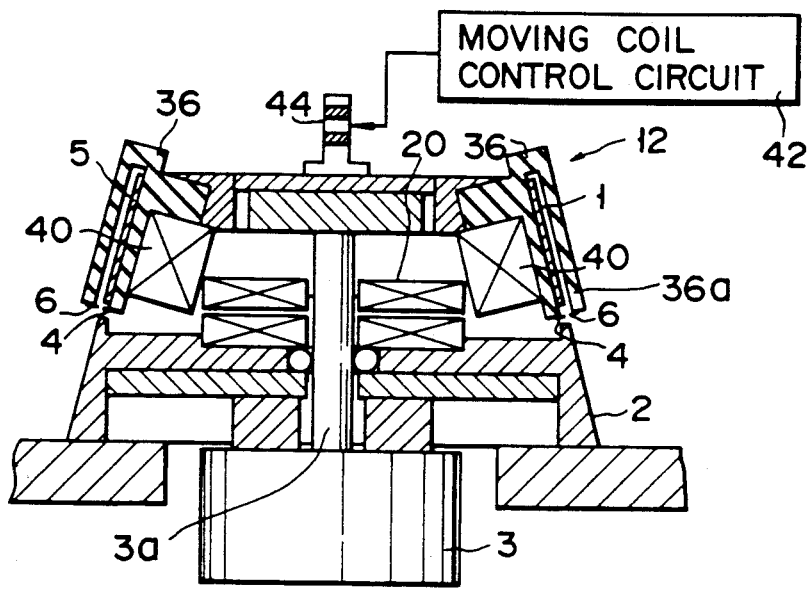
Figure 23:
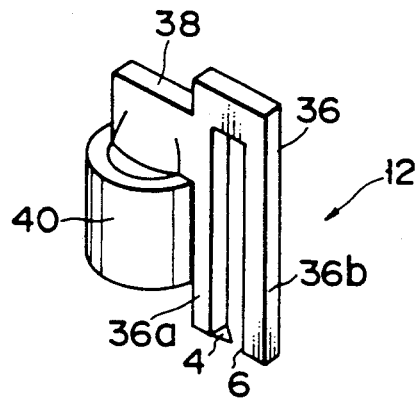

More specifically, each head unit 12 is provided with a U-shaped supporting member 36, as shown in FIGS. 22 and 23. The supporting member 36 includes a pair of parallel arms 36a and 36b, the respective upper ends of which are connected to each other. First and second head elements 4 and 6 are fixed to the lower ends of the arms 36a and 36b, respectively. The member 36 further includes a projecting portion 38 which protrudes from the upper end portion of the arm 36a at right angles thereto. The portion 38 is connected to a movable portion of a moving coil, which will be mentioned later. The supporting member 36 is mounted on the rotary drum 1 so that the peripheral wall of the drum 1 is located between the arms 36a and 36b and it is movable along the generator of the outer peripheral surface of the drum 1. The arms 36a and 36b, in particular, are located inside and outside the peripheral wall of the drum 1, respectively. The head elements 4 and 6 face each other across an opening in the peripheral wall and at a predetermined distance from each other.

Moving coils 40 as many as the head units 12 are arranged in the rotary drum 1. A movable portion (not shown) of each coil 40 is connected to the projecting portion 38 of its corresponding head unit 12. By changing the current flowing through the coils 40, the head elements 4 and 6, along with the supporting members 36, are moved for the maximum of about 3 mm, for example, along the generator of the guide surface 5 of the rotary drum 1. If the supporting members 36 are formed of a high-permeability material, such as ferrite, when main and auxiliary magnetic poles for vertical magnetic recording are used as the head elements 4 and 6, respectively, a closed magnetic path can be formed between the two magnetic poles. Thus, a high-efficiency single-pole head of the auxiliary pole excitation type can be constructed.

A rotary transformer 20 is disposed in the rotary drum 1, and signals to be recorded or reproduced are transferred between the head elements 4 and 6 and external equipment through the transformer 20. More specifically, the information signals to be recorded are externally transmitted through the rotary transformer 20 to a recording amplifier (not shown) in the drum 1, and are recorded on the magnetic tape 7 by means of the head elements 4 and 6. At the time of reproducing operation, signals retrieved from the tape 7 by means of the head elements 4 and 6 are amplified by means of a reproducing amplifier (not shown) in the rotary drum 1, and are then fetched out through the rotary transformer 20.

The electric power supply to electronic circuits (recording and reproducing amplifiers, etc.) in the rotary drum 1 and the supply of driving signals from a moving coil control circuit 42 (mentioned later) to the moving coils 40 are effected from the outside through a slip ring 44, which is coaxially fixed to the top portion of the drum 1.

Figure 24:
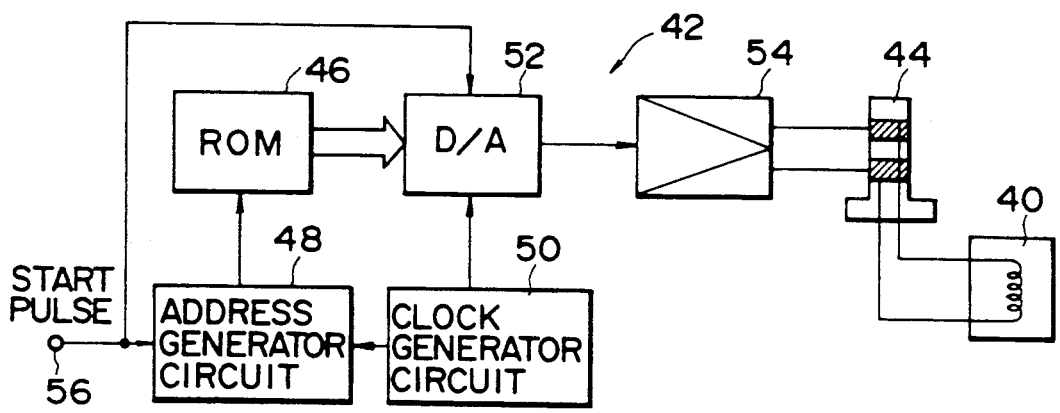

FIG. 24 is a block diagram showing a specific example of the moving coil control circuit 42 for driving the moving coils 20. The circuit 42 includes a ROM (read-only memory) 46, address generator circuit 48, clock generator circuit 50, D/A converter 52, and driver circuit 54.

Figure 29:
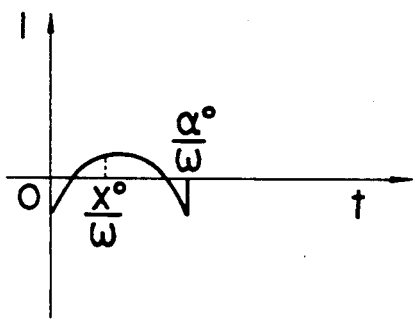
Figure 30:
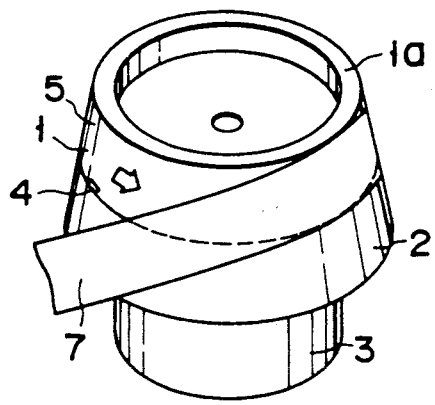
FIG. 30 is a perspective view showing a rotary head device provided with a first head element only.

A terminal 56 is supplied with start pulse which is generated in synchronism with the rotation of the rotary drum 1 by means of a pulse generator (not shown) of the rotary head device. On receiving this start pulse, the address generator circuit 48 is started, and address signals for the ROM 46 are successively generated from the circuit 48 in accordance with clock signals from the clock generator circuit 50. The ROM 46 is previously stored with position control data for the head elements 4 and 6 as digital data. In other words, the ROM 46 is stored with data obtained by converting control signals I for the moving coils 40, which vary with the passage of time t, as shown in FIG. 29, into digital values, which will be described in detail later. The contents of the ROM 46 are read out in accordance with the address signals from the address generator circuit 48. The read position control data are converted into analog signals by means of the D/A converter 52, which starts converting operation in response to the start pulse supplied to the terminal 56, and the analog signals are applied to the input of the driver circuit 54. The circuit 54 amplifies the input control signals, and supplies a driving current to the moving coils 40 through the slip ring 44. The movable portions of the coils 40 are shifted in proportion to the driving current, whereby the head elements 4 and 6, along with the supporting members 36, are moved along the generator of the conical surface of the rotary drum 1.

The following is a description of the operation of the rotary head device according to the second embodiment.

Figure 25:
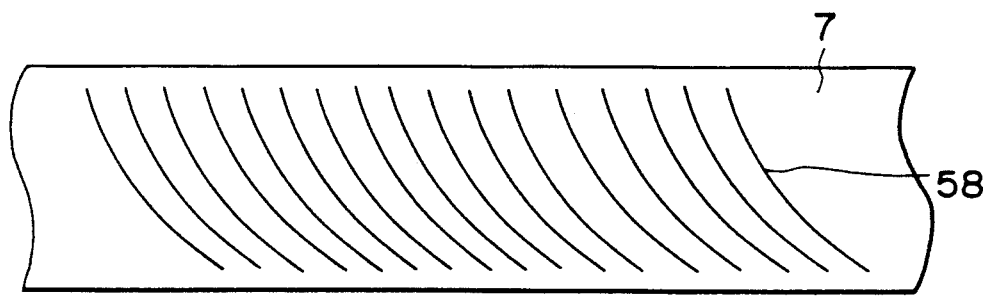

The rotary head device of this embodiment, like the one according to the first embodiment, is provided with the recording and reproducing circuit shown in FIG. 12. In this device, the size of the rotary drum 1 and the way the magnetic tape 7 is wound on the drums 1 and 2 are such that the scanning path of each of the head elements 4 and 6 on the tape 7 extends close to the lower side edge of the tape from the upper side edge, as shown in FIG. 8. If the supporting members 36 supporting the elements 4 and 6 are fixed to the rotary drum 1, the scanning path AB of each head element on the magnetic tape 7 is basically fan-shaped, as shown in FIG. 8. If the front half of the scanning path AB is actually used for the recording or reproducing, a track pattern on the tape 7 is composed of arcuate tracks 58 arranged in the longitudinal direction of the tape, as shown in FIG. 25. In this case, as mentioned before, the pitches of the tracks 58 are inevitably very short at the lower portion of the tape 7.

Figure 26:
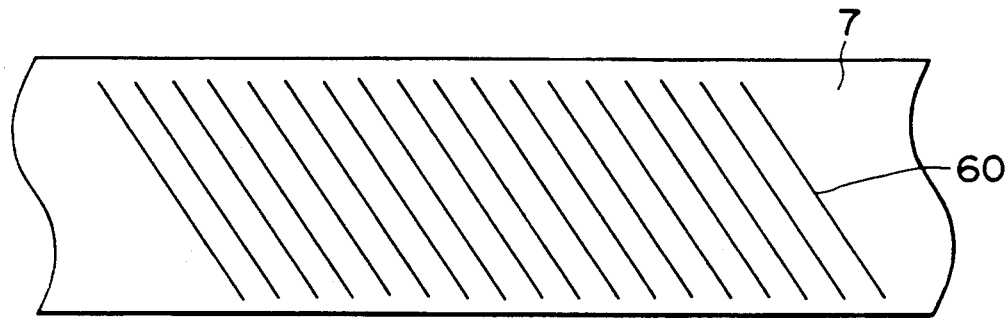
Figure 27:
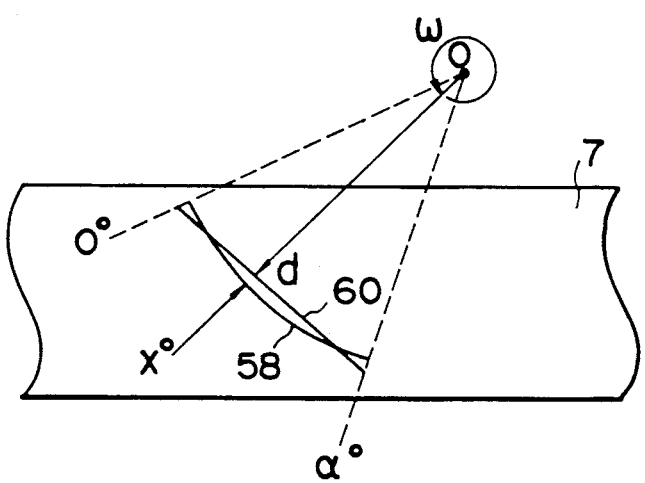
Figure 28:
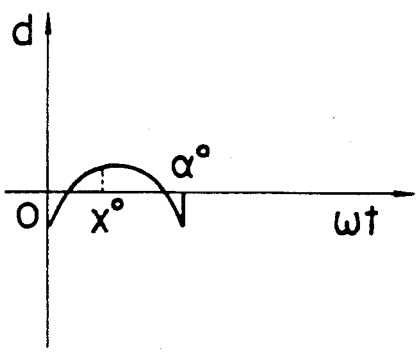

According to the second embodiment, therefore, the head elements 4 and 6 are moved for a distance equivalent to the difference in distance (along the generator of the conical surface of the rotary drum 1) between the arcuate tracks 58 and an arbitrary straight line inclined at an angle to the magnetic tape 7, so that each track is straight, as shown in FIG. 26. For example, there is a difference d in distance, along the base line of the guide surface 5 of the rotary drum 1, between the arcuate track 58 and a straight track 60 shown in FIG. 27, when the rotational angle of the head elements 4 and 6 is within the range from 0° to α°. FIG. 28 is a graph in which the axes of ordinate and abscissa represent the difference d in distance and the rotational angle ωt (ω is the angular velocity of the head elements, and t is time) of the elements 4 and 6.

Thereupon, in the moving coil control circuit 42 shown in FIG. 24, the ROM 46 is previously stored with the position control data obtained by converting the control signals I (FIG. 29), which are proportional to the difference d in distance, into digital values, with the storage address corresponding to the time t. As the rotational angle ωt increases, that is, as the time t elapses after the entry of the start pulse, the contents (position control data) of the ROM 46 are read out while changing address data from the address generator circuit 48 in succession, and the amplification gain is suitably adjusted. By doing this, the head elements 4 and 6 are shifted along the generator of the guide surface 5 of the rotary drum 1 by the control circuit 42 so that the difference d in distance is reduced to zero. Thus, the straight tracks 60 is formed on the magnetic tape 7.

According to the second embodiment constructed in this manner, the following advantages can be obtained besides the same advantages of the first embodiment.

The scanning path of the head elements 4 and 6 can be made straight by moving these elements along the generator of the guide surface 5 of the rotary drum 1 in accordance with the rotational angle of the head elements. Accordingly, the track pattern formed on the magnetic tape 7 is composed of the straight tracks extending parallel to one another, as shown in FIG. 26. The spaces between the tracks 60 are always uniform with respect to the longitudinal direction of the tape 7. Accordingly, the track density is made uniform, so that uniform recording density can be obtained throughout the recording region of the magnetic tape 7. Thus, the surface recording density of the tape, that is, the recording capacity, can be increased for higher-density recording.

Basically, the track pattern shown in FIG. 26 is identical with the one obtained by means of the conventional helical scanning system. Despite the use of the rotary drum which has the conical guide surface, therefore, the device of the present embodiment can be made plug-compatible with a recording and reproducing apparatus of the helical scanning system, which uses a conventional rotary drum having a cylindrical guide surface.

It is to be understood that the present invention is not limited to the embodiments described above, and that various changes and modifications may be effected therein by one skilled in the art without departing from the scope or spirit of the invention.

For example, the head units are not limited to six in number, and may be increased or decreased as required. Further, the rotary drum and the stationary drum may be located inversely or so that the former underlies the latter. Alternatively, moreover, the stationary drum may be omitted.

The same technical means for the conventional rotary head device may be additionally provided as required, including a groove on the respective outer peripheral surfaces of the rotary and stationary drums for controlling an air current.

When applying the rotary head device of the present invention to an apparatus for reproducing only, moreover, the second head element on the outside may be omitted so that each head unit is provided with the first head element only.

In the second embodiment, the means for moving the head units along the generator of the guide surface of the rotary drum is not limited to the moving coils, and may be formed of any other suitable actuators, such as stepping motors, bimorph piezoelectric elements, etc. This moving means may be also used as an actuator for auto-tracking between the tracks on the recording medium and the head elements at the time of reproducing operation.

Figure 31:
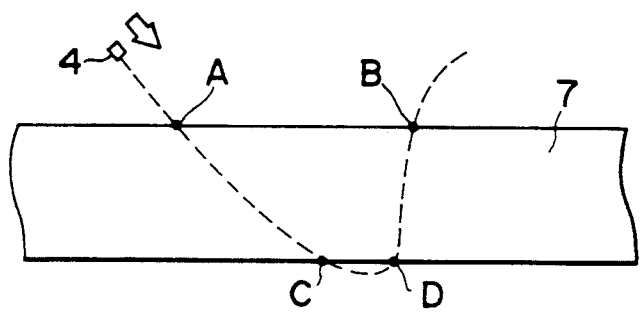
FIG. 31 is a plan view showing an example of a scanning path whose first and second halves are different in shape.

By adjusting the displacement of the head elements with use of the moving means, furthermore, the first half (between points A and C) and the second half (between points D and B) of the scanning path of the head elements on the recording medium may be made different in shape, as shown in FIG. 31.

What is claimed is:

1. A rotary head device of a recording and reproducing apparatus for running a tape-shaped recording medium with a pair of side edges in a longitudinal direction thereof, and recording and reproducing information on and from the recording medium, said device comprising:

a rotary drum arranged for rotation and having a guide surface formed of a conical surface coaxial with the axis of rotation of the rotary drum and wound with the recording medium by about 180 degrees in a circumferential direction of the guide surface;

six head units mounted on the rotary drum at equal intervals in the circumferential direction of the guide surface and rotatable integrally therewith, each of said head units including first and second head elements facing each other, for scanning the recording medium wound on the guide surface, while the recording medium is being interposed between the first and second head elements, as the rotary drum rotates, whereby the recording medium is interposed between head elements of at least three head units at all times; and circuit means for causing the first and second head elements of each head unit to consecutively record and reproduce information on and from the recording medium when the first and second head elements scan the recording medium.

2. A device according to claim 1, wherein said guide surface has a circular first end edge and a circular second end edge coaxial with the rotary drum, said first end edge having a diameter smaller than that of the second end edge and being situated so as to have no intersection with the side edges of the recording medium wound on the guide surface.

3. A device according to claim 1, wherein said guide surface is formed so that the second end edge crosses a side edge of the recording medium wound on the guide surface which is situated on the first end edge side, at two points.

4. A device according to claim 2, wherein said rotary drum has the shape of a truncated cone, and an outer circumferential surface which constitutes the guide surface between the first and second end edges.

5. A device according to claim 4, wherein said first head element of each head unit is provided at the second end edge of the guide surface, the second head element of each head unit is opposite to said first head element at a predetermined distance therefrom, and each of said head units includes a supporting member having a first end fixed to the rotary drum in the vicinity of the first end edge and a second end supporting said second head element.

6. A device according to claim 5, wherein said supporting member extends parallel to the guide surface, from said first end thereof to the second end, and at a predetermined distance from the guide surface.

7. A device according to claim 4, which further comprises a stationary drum arranged coaxially with the guide surface and close to the second end edge of the guide surface, said stationary drum having an outer circumferential surface formed of a conical surface continuous with the guide surface.

8. A device according to claim 5, wherein said first head element projects for a predetermined distance from the guide surface, and which further comprises projection means for keeping the recording medium apart from the guide surface at a position where the second end edge of the guide surface crosses the side edge of the recording medium so as to prevent said first head element from running against the side edge of the recording medium.

9. A device according to claim 1, wherein said first and second head elements are formed of a main electrode and an auxiliary electrode, respectively, for vertical magnetic recording.

10. A device according to claim 1, wherein said first and second head elements are formed of an optical head and a magnetic head, respectively, for photomagnetic recording.

11. A rotary head device of a recording and reproducing apparatus for longitudinally running a tape-shaped recording medium having first and second parallel side edges and two belt-shaped regions extending side by side in a longitudinal direction thereof, and recording and retrieving information on and from the recording medium, said device comprising:
   a rotary drum arranged for rotation and having a guide surface formed of a conical surface coaxial with an axis of rotation of the rotary drum and wound with the recording medium by about 180 degrees in a circumferential direction of the guide surface;
   six head units mounted on the rotary drum at equal intervals in the circumferential direction of the guide surface and rotatable integrally therewith, each of said head units including two head elements facing each other, for scanning the recording medium wound on the guide surface, while the recording medium is being interposed between the head elements, as the rotary drum rotates, said head elements of each head unit forming scanning paths on the recording medium, starting and terminating at the first side edge of the recording medium, whereby the recording medium is interposed between head elements of at least three head units at all times; and
   circuit means for causing the head elements to record and retrieve information on and from the recording medium when the head elements of each head unit scan a selected one of the belt-shaped regions of the recording medium.

12. A rotary head device of a recording and reproducing apparatus for longitudinally running a tape-shaped recording medium, having first and second parallel side edges and two belt-shaped regions extending side by side in a longitudinal direction thereof, and recording and retrieving information on and from the recording medium, said device comprising:
   a rotary drum arranged for rotation and having a guide surface formed of a conical surface coaxial with an axis of rotation of the rotary drum and wound with the recording medium by about 180 degrees in a circumferential direction of the guide surface;
   six head units mounted on the rotary drum with equal intervals in the circumferential direction of the guide surface and rotatable integrally therewith, each of said head units including two head elements facing each other, for scanning the recording medium wound on the guide surface, while the recording medium is being interposed between the head elements, as the rotary drum rotates, said head elements of each head unit forming scanning paths on the recording medium, starting and terminating at the first side edge of the recording medium, whereby the recording medium is interposed between head elements of at least three head units at all times; and
   circuit means for causing the head elements to record and retrieve information on and from the recording medium every time the head elements of each head unit scan either of the belt-shaped regions of the recording medium.

* * * * *